PATENTED JUN29 1971 3,589,450
SHEET 1 OF 2
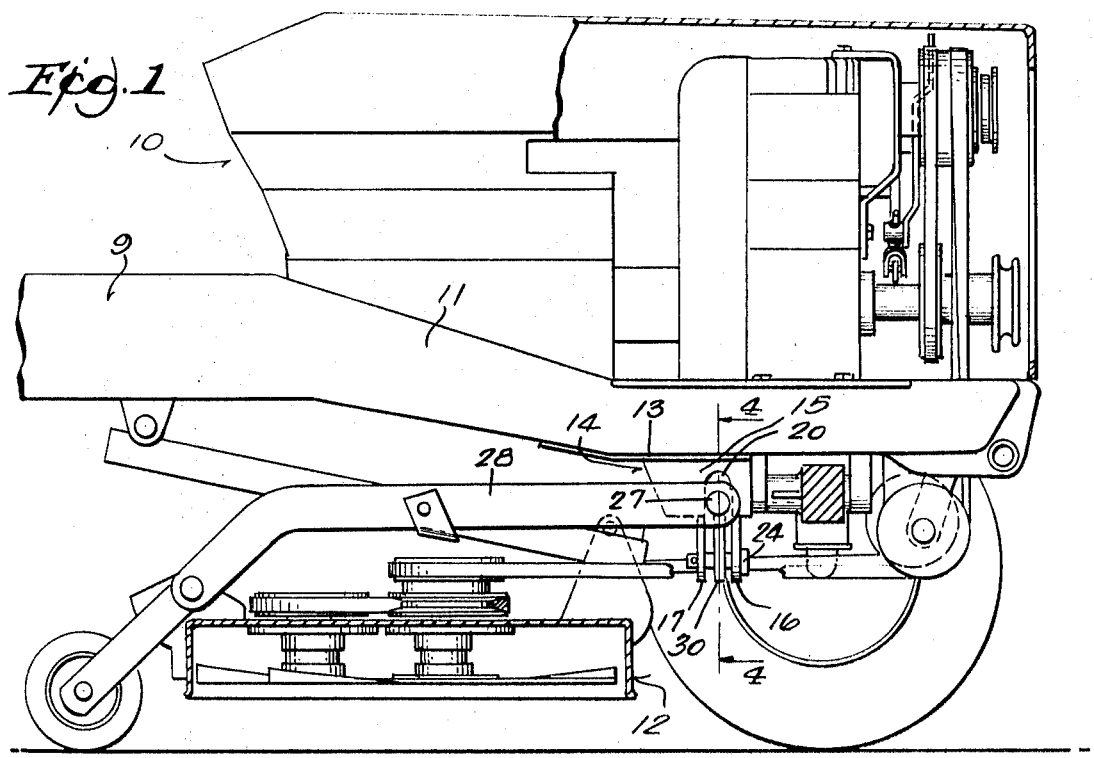
Fig. 1
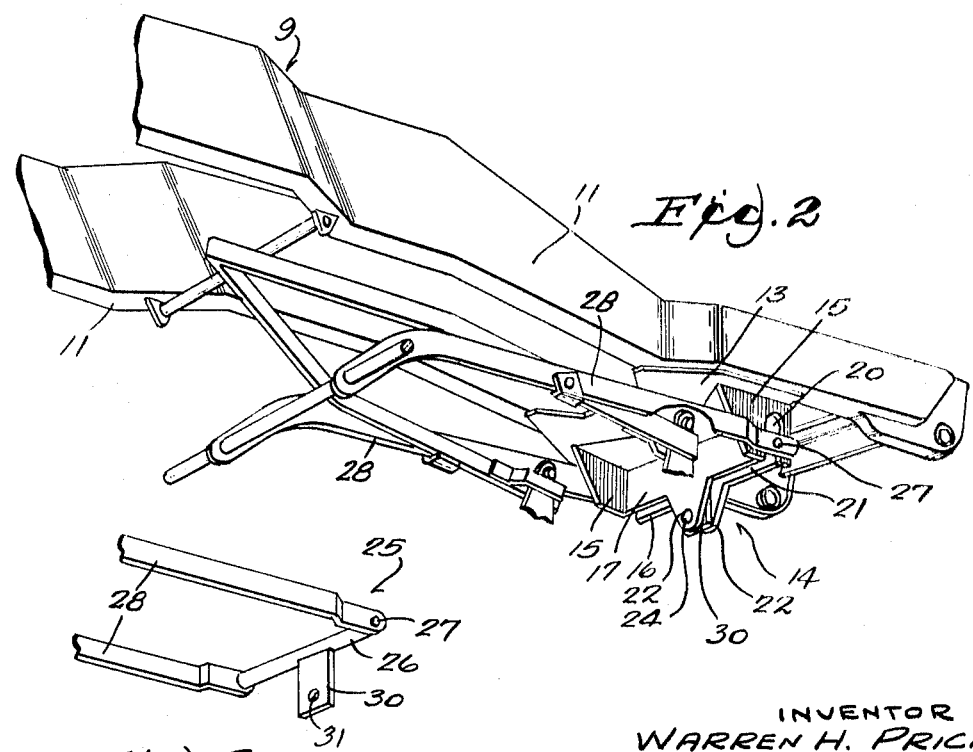
Fig. 2
Fig. 3
INVENTOR
WARREN H. PRICE
BY Wheeler, Wheeler, House & Clemency
ATTORNEYS

United States Patent

[11] 3,589,450

| [72] | Inventor | Warren H. Price |
| | | Sheboygan, Wis. |
| [21] | Appl. No. | 688,540 |
| [22] | Filed | Dec. 6, 1967 |
| [45] | Patented | June 29, 1971 |
| [73] | Assignee | Gilson Brothers Co. |
| | | Plymouth, Wis. |

[54] ATTACHMENT HITCH FOR TRACTORS
5 Claims, 8 Drawing Figs.

[52] U.S. Cl................................................. 172/273,
172/247, 56/24.5, 172/448, 172/781, 172/763
[51] Int. Cl.................................................. A01b 51/00
[50] Field of Search........................................ 172/677,
669, 671, 674, 675, 679, 680, 272, 273, 274, 275,
312, 332, 345, 396, 397, 446, 448, 276, 803, 806,
780, 763, 781, 780, 797, 63, 450, 98, 117, 247,
240, 439; 280/186; 56/228, 25.4

[56] References Cited
UNITED STATES PATENTS

| 2,402,976 | 7/1946 | Olson | 172/803 |
| 2,735,200 | 2/1956 | Arps | 172/806 |
| 2,881,541 | 4/1959 | Darnell | 172/780 |
| 3,118,266 | 1/1964 | Colburn | 56/25.4 |
| 3,226,859 | 1/1966 | Kampert | 172/806 |
| 3,226,860 | 1/1966 | McGee | 172/806 |
| 3,255,577 | 6/1966 | Colburn | 56/25.4 |
| 3,334,476 | 8/1967 | Engler | 56/25.4 |
| 2,888,997 | 6/1959 | Fraga | 172/449 |

FOREIGN PATENTS

| 159,449 | 11/1953 | Australia | 172/781 |
| 721,790 | 1/1955 | Great Britain | 172/806 |

*Primary Examiner*—Edgar S. Burr
*Attorney*—Wheeler, Wheeler, House & Clemency

ABSTRACT: This disclosure relates to an attachment hitch for tractors in which the attachment is connected to and released from the tractor by manipulation of a single pin. The hitch transmits thrust to the attachment draft arms without imposing any stress on the pin. In one embodiment the hitch coupling attached to the implement is free to rock about the axis of the pin, and in another embodiment the hitch coupling is restrained from any such rocking motion. The hitch comprises a hanger bracket attached to the undersurface of the tractor. The bracket has a laterally elongated downwardly open way and a pin socket disposed centrally of the way on a longitudinal axis. The attachment comprises a hitch coupling with a transverse draw bar receivable upwardly into said way and a coupling piece with a pin socket aligned with a pin socket on the hanger bracket and a pin receivable through said sockets to connect the hitch coupling to the hanger bracket.

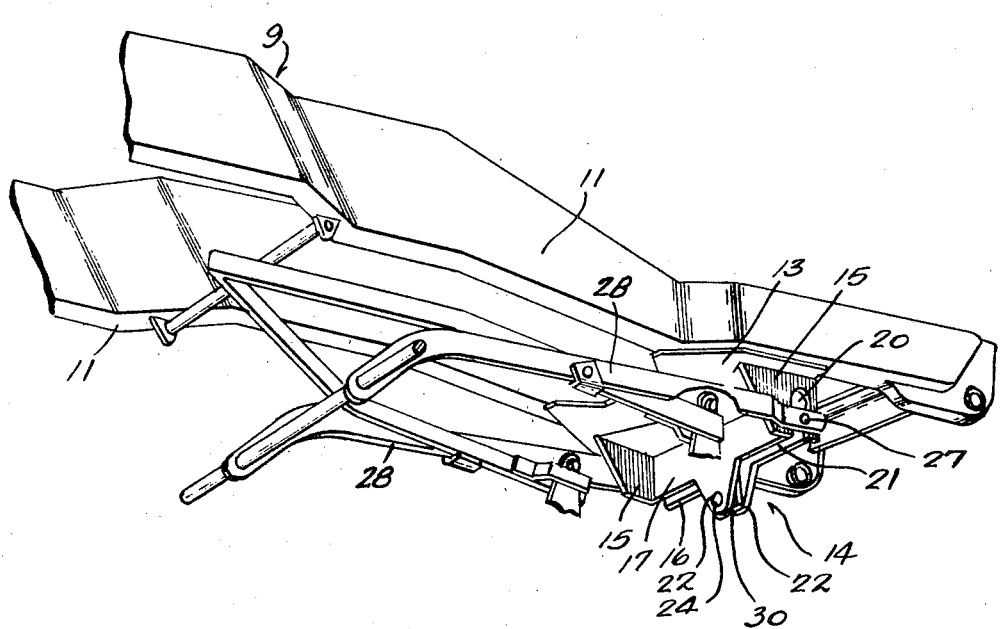

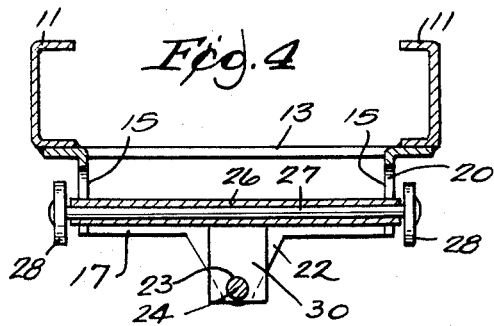
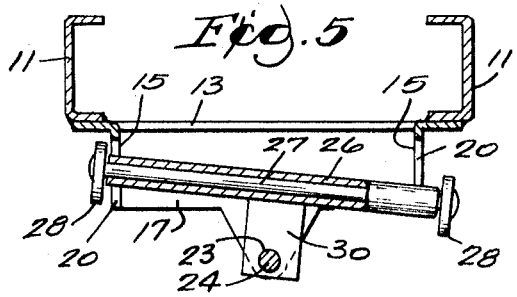
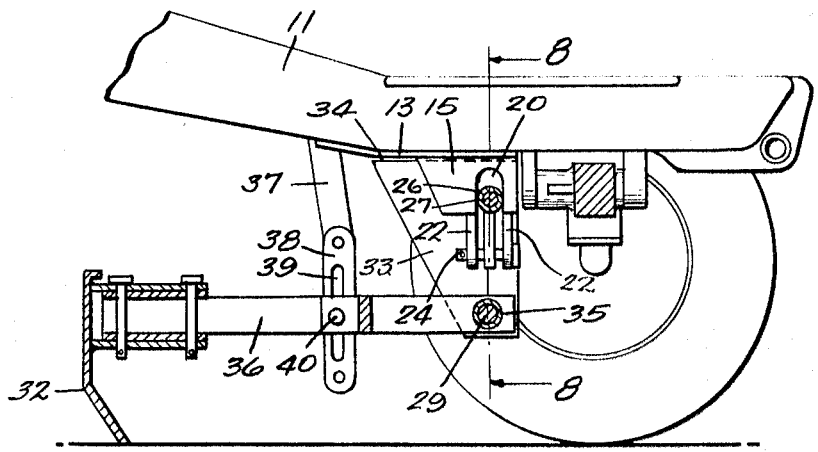
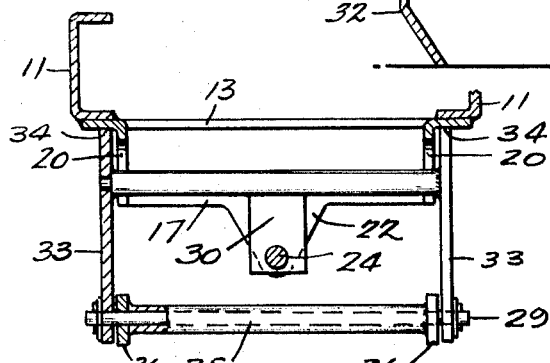
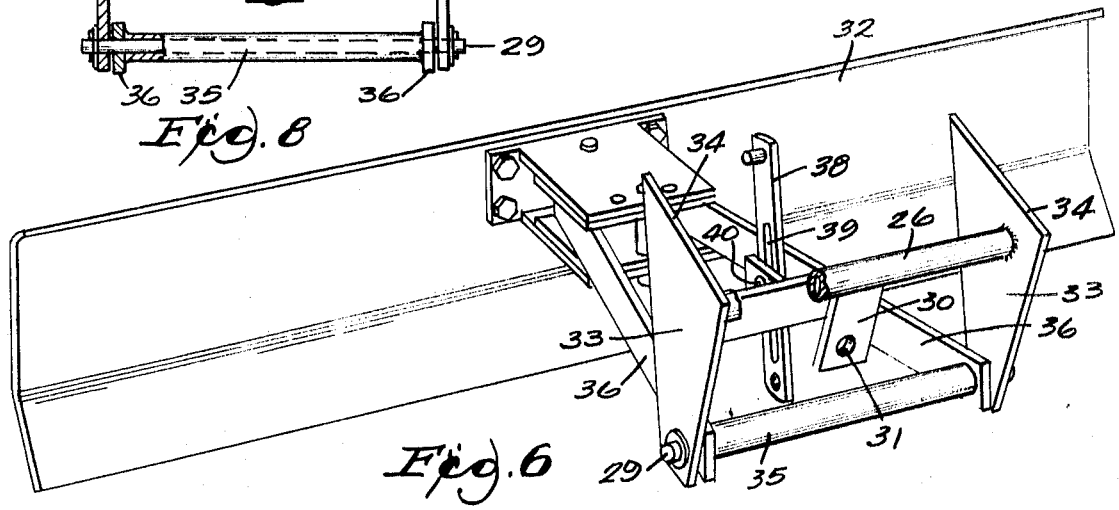

ATTACHMENT HITCH FOR TRACTORS

CROSS-REFERENCE TO RELATED APPLICATIONS

Cross-reference is made to my copending U.S. Pat. applications Ser. No. 652,567, filed July 11, 1967, now U.S. Pat. No. 3,483,684, and Ser. No. 672,095, filed Oct. 2, 1967 now abandoned in favor of application Ser. No. 880,479, filed Dec. 10, 1969.

BACKGROUND OF THE INVENTION

Prior attachment hitches known to me typically involve the necessity for the use of several pins or connecting elements to mount the attachment to the tractor. Moreover, the pins which perform the mounting function are also typically stressed during transmission of pulling thrust from the tractor to the attachment.

SUMMARY OF THE INVENTION

In accordance with the present invention, the hitch coupling on the attachment is very easily coupled and uncoupled from the tractor. Only a single pin is manipulated. This pin is inserted and removed from its sockets without requiring the use of any tools.

The hanger bracket which depends from the undersurface of the tractor cooperates with the hitch coupling in such a way that drawing thrust is transmitted to the attachment without stressing the pin. Accordingly, the pin serves primarily a retaining function. It does not constitute a part of the thrust-transmitting mechanism.

In preferred embodiments disclosed herein, the hanger bracket has a downward open way disposed on an axis aligned transversely of the longitudinal axis of the tractor. The attachment has a hitch coupling which includes a transverse drawbar receivable upwardly into the way. The hanger bracket and hitch coupling have complementary pin sockets which receive the mounting pin to hold the drawbar in the way. All thrust transmission is directly between the hanger bracket and the drawbar, no thrust being imposed upon the pin.

In one embodiment the drawbar is free for limited pivotal movement within the way and about the pin axis. Accordingly, the hitch coupling may rock laterally to permit the attachment to float laterally about the axis of the pin. In another embodiment the drawbar is braced against such pivotal movement, thus to require the implement to follow transverse rocking movements of the tractor frame.

Other objects, features, and advantages of the invention will appear from the following disclosure.

DESCRIPTION OF THE DRAWINGS

FIG. 1 is a vertical longitudinal cross section taken through a tractor embodying an attachment hitch according to the present invention.

FIG. 2 is a fragmentary perspective view from beneath the tractor frame, showing the attachment hitch of the present invention depending therefrom and a portion of an attachment with its hitch coupling.

FIG. 3 is a fragmentary inverted perspective view showing one embodiment of hitch coupling attached to the draft bars of the attachment.

FIG. 4 is a fragmentary cross section taken along the line 4—4 of FIG. 1.

FIG. 5 is a view similar to FIG. 4, but showing the hitch coupling in a laterally rocked position.

FIG. 6 is a perspective view of a modified hitch coupling shown attached to a grader attachment and in which the drawbar is provided with brackets by which it is braced against pivotal movement.

FIG. 7 is a fragmentary longitudinal cross section taken through the attachment of FIG. 6 and its mounting on the tractor.

FIG. 8 is a fragmentary cross section taken along the line 8—8 of FIG. 7.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The apparatus shown in FIGS. 1 through 5 is also shown in my copending U.S. Pat. application Ser. No. 652,567 aforesaid. In this embodiment the tractor 10 draws a rotary mower attachment 12. It is desirable that this rotary mower attachment float laterally so as to follow the contour of the ground.

The tractor frame 9 is in accordance with my copending U.S. Pat. application Ser. No. 672,095 aforesaid. The side beams 11 of the frame 9 are cross-connected at the front of the frame by a horizontal cross plate 13. Depending from plate 13 is a hanger bracket 14 which is desirably prefabricated independently of the tractor frame and welded to the plate 13.

The hanger bracket 14 comprises end plates 15 and fore-and-aft plates 16, 17. The end plates 15 are provided with vertically elongated, downwardly open slots 20. These are laterally aligned on the transverse axis of the tractor. Fore-and-aft plates 16, 17 are respectively to the front and rear of the edges of slot 20 and span laterally between end plates 15. The open space between plates 16, 17 constitutes a downwardly open channel or way 21.

Plates 16, 17 are also provided with downwardly projecting ears 22 having pin sockets 23 aligned in the direction of tractor movement. Sockets 23 receive the pin 24 on which the hitch coupling 25 of the attachment is mounted to the hanger bracket 14.

The hitch coupling 25 for the mower attachment 12 is best shown in FIG. 3 and comprises a transverse drawbar or tube 26 within which there is a shaft 27 having its ends connected to the draft arms 28 of the support linkage by which the mower 12 is supported beneath the tractor 10. Downwardly depending from the drawbar or tube 26 is a coupling piece or tab 30 which has a pin socket 31 which aligns with the pin sockets 23 in the ears 22 of the hanger bracket 14 when the hitch coupling 25 is coupled to the hanger bracket, as is shown in FIGS. 1, 2, 4, and 5. To connect hitch coupling 25 to the hanger bracket 14, draw bar 26 is lifted into the way 21 between the fore-and-aft plates 16, 17, and the pin 24 is inserted through the aligned sockets 23, 31, thus to hold the drawbar 26 in the way 21. The tractor will then transmit pulling thrust directly from the hanger bracket 14 to the drawbar 26 to exert pulling pressure on the draft arms 28 without imposing any pressure on the pin 24. The pin 24 is required only to support the hitch coupling against gravity and to center the drawbar laterally in the way 21.

Moreover, in the embodiment of FIGS. 1 through 5, pin 24 provides a pivot axis about which the drawbar 26 may rock laterally within the range permitted by the elongation of the slots 20 in the end walls 15 of the hanger bracket 14. Typically, pivoting in the range of about 15° is permitted.

FIGS. 6 through 8 show a modified embodiment in which a grader blade 32 constitutes the attachment to be drawn by the tractor. In this embodiment it is desired that the grader blade follow lateral movements of the frame. Accordingly, the drawbar 26 of the hitch coupling has its ends secured to bracing arms or plates 33 which have upper edges 34 also positioned with respect to the drawbar 26, so that these edges are engaged with the undersurface of the tractor when the hitch coupling is mounted as shown in FIGS. 7 and 8. Accordingly, the end plates 33 stabilize or lock the drawbar 26 against any pivotal movement about the axis of pin 24.

The lower ends of plates 33 carry a cross-shaft 29 on which tube 36 may pivot. Tube 35 cross-connects the front end of draft bars 36 for the grader 32.

Height control means is also provided to limit the extend of pivotal movement of the draft arms 36 about the axis of the tube 35. As best shown in FIGS. 6 and 7, this consists of a lift bracket 37 which has an extension 38 with a vertical slot 39 in which cross pin 40 may play. The vertical adjustment of the bracket 37 will limit the depth of penetration of the grader blade 32. As the tractor frame tilts laterally, this tilting motion is also imparted to the grader blade 32 through the brace plates 33, thus to require the grader to follow tilting movement of the tractor.

I claim:

1. In a tractor having an attachment hitch at its underside and an attachment drawn by the hitch at its underside and an attachment drawn by the hitch, the improvement in which the hitch comprises a hanger bracket having a downwardly open way disposed on a transverse axis and a pin socket disposed on a longitudinal axis, said attachment having a hitch coupling with a transverse drawbar receivable upwardly into said way and a coupling piece having a pin socket aligned with the pin socket on the hanger bracket, and a pin receivable through said sockets to connect the hitch coupling to the hanger bracket, said hanger bracket comprising end plates with upwardly extending, downwardly open slots which define said way, and front and rear plates which span laterally from one end plate to the other respectively at the front and rear of said slots, said front and rear plates having longitudinally aligned holes which constitute said pin socket on the hanger bracket, said coupling piece comprising a tab extending downwardly from the drawbar, said front and rear plates having downwardly extending ears within which said pin sockets are formed.

2. In a tractor having an attachment hitch at its underside and an attachment drawn by the hitch, the improvement in which the hitch comprises a hanger bracket attached to the tractor and having an elongated downwardly open way disposed on a transverse axis and a pin socket disposed centrally of said way and on a longitudinal axis, said attachment having a hitch coupling with a transverse drawbar receivable upwardly into said way and into direct drawing thrust-transmitting relation to the hanger bracket and a coupling piece having a pin socket aligned with the pin socket on the hanger bracket, and a pin receivable through said sockets to connect this hitch coupling to the hanger bracket and support the drawbar in direct drawing thrust-transmitting relation to the hanger bracket without imposing such thrust on the pin, said drawbar being provided with means for locking it against pivotal movement in said way about the longitudinal axis of said pin whereby the hitch coupling follows transverse movements of the tractor.

3. The invention of claim 3 in which said means for locking comprises brace arms at the ends of said drawbar, said brace arms engaging fixed parts of the tractor when the pin is engaged in its socket to lock said drawbar.

4. The invention of claim 2 in which the attachment comprises a grader, said grader following the transverse movements of the tractor, and depth control means connecting the grader to the tractor at a point rearwardly of said hitch.

5. A single point hitch for connecting an attachment to a tractor, said hitch comprising a hanger bracket attached to and depending from the undersurface of the tractor, said bracket having a downwardly open, laterally elongated channel and a pin socket centrally of the channel and aligned in the direction of tractor movement, said attachment having a coupling including a drawbar receivable into said channel and into direct drawing thrust-transmitting relation to the hanger bracket to transmit tractor-drawing pressure to the attachment and a coupling piece having a pin socket aligned with the pin socket on the hanger bracket, and a pin receivable through said sockets to releasably connect the hitch coupling to the hanger bracket and support the drawbar in direct drawing thrust-transmitting relation to the hanger bracket without imposing such thrust on the pin, said drawbar having stabilizing arms braced against fixed parts of the tractor when the pin couples the attachment to the hanger bracket, whereby the drawbar is held against rocking movement laterally about the pin axis.

UNITED STATES PATENT OFFICE
CERTIFICATE OF CORRECTION

Patent No. 3,589,450          Dated June 29, 1971

Inventor(s) Warren H. Price

It is certified that error appears in the above-identified patent and that said Letters Patent are hereby corrected as shown below:

Column 2, Line 74, "36" should read-------35----------

Column 3, Line 1, "extend" should read-----extent-----

Column 3, Line 13, delete "and an attachment drawn by the hitch at its underside"

Column 4, Line 12, change "claim 3" to "claim 2"

Signed and sealed this 15th day of February 1972.

(SEAL)
Attest:

EDWARD M. FLETCHER, JR.          ROBERT GOTTSCHALK
Attesting Officer                 Commissioner of Patents